US009459944B2

(12) United States Patent
Hillesund et al.

(10) Patent No.: US 9,459,944 B2
(45) Date of Patent: Oct. 4, 2016

(54) METHOD AND SYSTEM FOR STREAMER REDUNDANCY

(71) Applicant: PGS Geophysical AS, Oslo (NO)

(72) Inventors: Øyvind Hillesund, Nesbru (NO); Geir Andre Motzfeldt Drange, Borgen (NO)

(73) Assignee: PGS Geophysical AS, Oslo (NO)

( * ) Notice: Subject to any disclaimer, the term of this patent is extended or adjusted under 35 U.S.C. 154(b) by 285 days.

(21) Appl. No.: 14/176,562

(22) Filed: Feb. 10, 2014

(65) Prior Publication Data

US 2015/0121124 A1    Apr. 30, 2015

Related U.S. Application Data

(60) Provisional application No. 61/897,533, filed on Oct. 30, 2013.

(51) Int. Cl.
| | |
|---|---|
| G06F 11/07 | (2006.01) |
| G01V 1/22 | (2006.01) |
| G01V 1/38 | (2006.01) |
| G01V 3/17 | (2006.01) |

(52) U.S. Cl.
CPC ............. *G06F 11/0745* (2013.01); *G01V 1/22* (2013.01); *G01V 1/38* (2013.01); *G01V 3/17* (2013.01)

(58) Field of Classification Search
CPC ...... G01F 11/0745; G01V 3/17; G01V 1/38; G01V 1/22
USPC ................................. 367/20; 714/5.1, 2, 4.1
See application file for complete search history.

(56) References Cited

U.S. PATENT DOCUMENTS

| | | | | |
|---|---|---|---|---|
| 4,319,347 | A | * | 3/1982 | Savit ........................ G01V 1/20 367/52 |
| 4,635,237 | A | | 1/1987 | Benestad et al. |
| 8,077,542 | B2 | | 12/2011 | Gulbransen et al. |

(Continued)

FOREIGN PATENT DOCUMENTS

| | | |
|---|---|---|
| EP | 0372908 A2 | 5/2000 |
| EP | 2447737 B1 | 5/2013 |
| WO | 0029717 A2 | 5/2000 |

OTHER PUBLICATIONS

"Multiway switching," Wikipedia, 2012, downloaded Jan. 23, 2016 from https://en.wikipedia.org/w/index.php?title=Multiway_switching&oldid=519020216, 5 pp.*

(Continued)

*Primary Examiner* — Daniel L Murphy

(57) ABSTRACT

Streamer redundancy. At least some illustrative embodiments are methods including: in a streamer towed by a survey vessel, sensing a first interconnection of a daisy chain the first interconnection between a first networked unit and a second networked unit, wherein the first networked unit and the second networked unit comprise a portion of a plurality of networked units; and determining that a fault condition exists on the first interconnection in response to the sensing; disabling the first interconnection responsive to the fault condition; enabling a second interconnection responsive to the fault condition, wherein the second interconnection couples the first networked unit and a third networked unit of the plurality of networked units and wherein the second interconnection does not couple to the second networked unit; and reporting information indicative of the fault condition to the survey vessel via the second networked unit.

20 Claims, 7 Drawing Sheets

(56) References Cited

U.S. PATENT DOCUMENTS

| | | |
|---|---|---|
| 2008/0310298 A1 | 12/2008 | Drange |
| 2009/0140879 A1 | 6/2009 | Kamata et al. |
| 2010/0157728 A1* | 6/2010 | Gulbransen .......... G01V 1/3808 367/20 |
| 2011/0182145 A1 | 7/2011 | Virgin et al. |
| 2012/0081994 A1 | 4/2012 | Husom et al. |

OTHER PUBLICATIONS

European Extended Search report mailed on Mar. 18, 2015, in the prosecution of patent application No. 14189723.1 7 pages.

* cited by examiner

METHOD AND SYSTEM FOR STREAMER REDUNDANCY

CROSS-REFERENCE TO RELATED APPLICATIONS

This application claims the benefit of U.S. Provisional Application Ser. No. 61/897,533 filed Oct. 30, 2013 and titled "Method for Streamer Redundancy", which provisional application is incorporated by reference herein as if reproduced in full below.

BACKGROUND

Seismic and electromagnetic surveys may be two common types of geophysical survey. Geophysical survey equipment typically includes complex apparatus containing various components and connections. For example, a streamer commonly used in geophysical survey operation typically contains many sensors, sensor digitizing units, telemetry units, power units, navigation units, control units, and/or auxiliary units. All of these units are connected to a control/recording system onboard of a survey vessel, by way of one or multiple telemetry and power connections. When one of these units fails during operation, replacing the faulty unit (or "failed unit") may result in operating downtime, increased operating cost/time and other inefficiencies. Thus, systems and methods that mitigate downtime arising from the replacement of faulty devices in the streamer would provide a competitive advantage in the marketplace.

BRIEF DESCRIPTION OF THE DRAWINGS

For a detailed description of exemplary embodiments, reference will now be made to the accompanying drawings in which.

NOTATION AND NOMENCLATURE

Certain terms are used throughout the following description and claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . . " Also, the term "couple" or "couples" is intended to mean either an indirect or direct connection. Thus, if a first device couples to a second device, that connection may be through a direct connection or through an indirect connection via other devices and connections.

"Cable" shall mean a flexible, load carrying member that also comprises electrical conductors and/or optical conductors for carrying electrical power and/or signals between components.

"Rope" shall mean a flexible, axial load carrying member that does not include electrical and/or optical conductors. Such a rope may be made from fiber, steel, other high strength material, chain, or combinations of such materials.

"Line" shall mean either a rope or a cable.

"Downstream" as used herein means, in the context of the relationship between daisy chain units, such units disposed in the direction of, or more proximal to, the survey vessel.

"Upstream" as used herein means, in the context of the relationship between daisy chain units, such units disposed in the direction opposite of, or more distal to, the survey vessel.

"Daisy chain" means, in the context of an interconnection between devices, an interconnection in which signals or power, as the case may be, are transmitted end-to-end through each device so interconnected.

"Networked unit" means a device deployed in a streamer and having input and output ports configurable to couple to a daisy chain interconnection. Examples of networked units include sensor digitizing units, telemetry units power units, navigation units control units and auxiliary units.

"Exemplary, as used herein, means "serving as an example, instance, or illustration." An embodiment described herein as "exemplary" is not necessarily to be construed as preferred or advantageous over other embodiments.

DETAILED DESCRIPTION

The following discussion is directed to various embodiments of the invention. Although one or more of these embodiments may be preferred, the embodiments disclosed should not be interpreted, or otherwise used, as limiting the scope of the disclosure or the claims. In addition, one skilled in the art will understand that the following description has broad application, and the discussion of any embodiment is meant only to be exemplary of that embodiment, and not intended to intimate that the scope of the disclosure or the claims, is limited to that embodiment.

Figure 1:
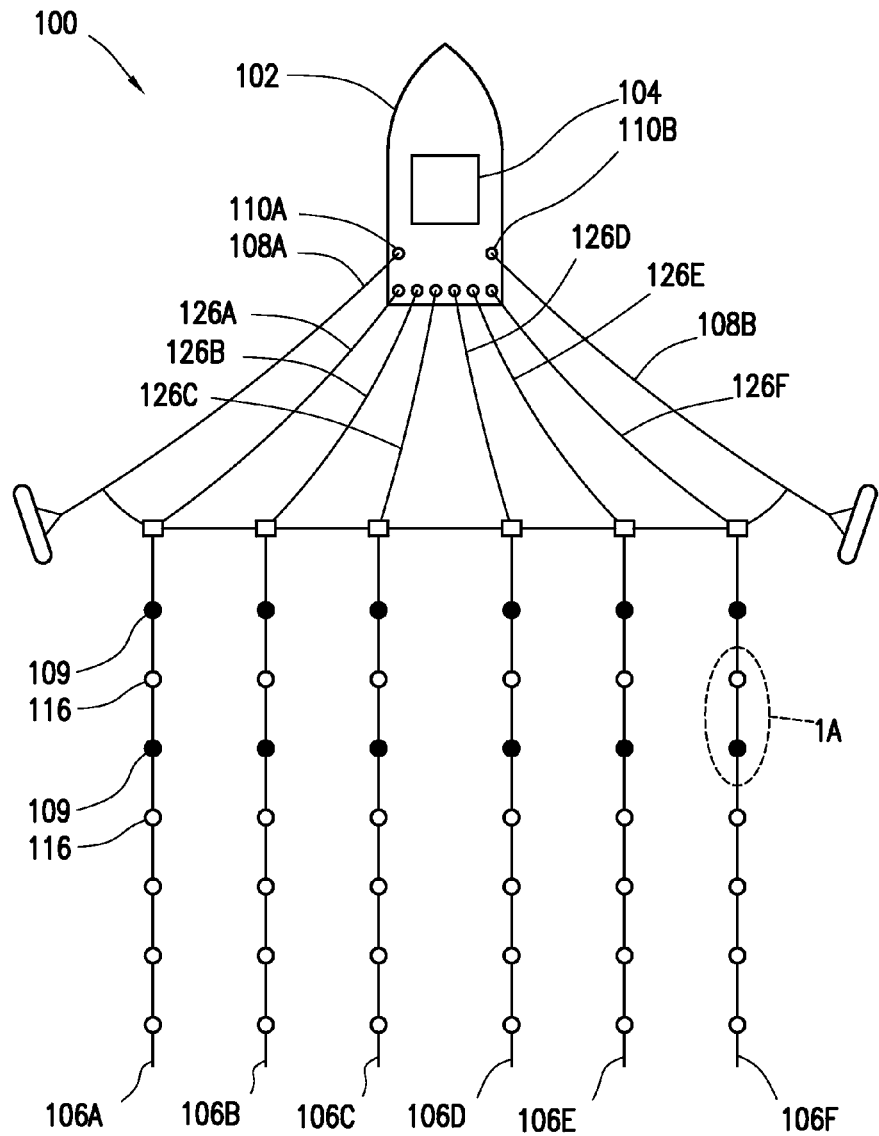
FIG. 1 shows an overhead view of a marine survey system in accordance with at least some embodiments.

FIG. 1 shows an overhead view of a marine survey system 100 in accordance with at least some embodiments. In particular, FIG. 1 shows a survey vessel 102 having onboard equipment, herein referred to collectively as recording system 104, such as navigation, energy source control, and data recording equipment. Survey vessel 102 is configured to tow one or more streamers 106A-F through the water. While FIG. 1 illustratively shows six streamers 106, any number of streamers 106 may be used.

The sensor streamers 106 are coupled to towing equipment that maintains the streamers 106 at selected depth and lateral positions with respect to each other and with respect to the survey vessel 102. The towing equipment may comprise two paravane tow lines 108A and 108B each coupled to the vessel 102 by way of winches 110A and 1108, respectively.

Electrical and/or optical connections between appropriate components in the onboard recording system 104, and components on the streamers 106, such as sensors 116 may be made using inner lead-in cables 126A-F via networked units 109 as described further herein below and in conjunction with FIGS. 2 and 3.

In a seismic survey, sensors 116 may include one or more instruments such as hydrophones, geophones or accelerometers to detect seismic signals. In an electromagnetic survey, sensors 116 may include electric field detector, a magnetic field detector or a combination electric field and magnetic field detector.

Figure 1A:
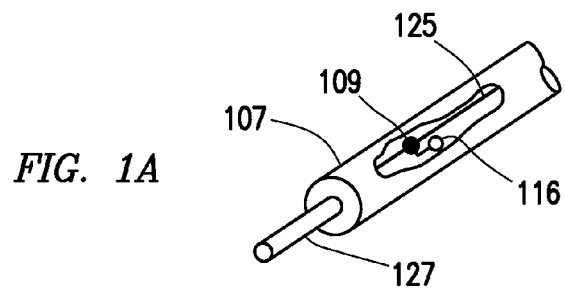
FIG. 1A shows portions of the marine survey system of FIG. 1 in further detail.

In either type of survey, a substantial number of sensors 116 may be interconnected via a communication pathway along a length of a streamer 106, which may, in some embodiments reach lengths of tens of kilometers. The sensors 116 may be accompanied by networked units 109 which may include telemetry units as well as power, navigation, control, and auxiliary units. Sensors 116 and networked units 109 may be disposed within an outer surface 107, FIG. 1A, of streamers 106, in which communication pathway 125 and rope 127 may also be disposed. In some embodiments, outer surface 107 may be distinguished by an outer jacket at least partially covering streamer 106; by way of example, polyurethane jackets, mesh jackets, or impermeable jackets with cutouts distributed along the length of streamer 106. Rope 127 may be provided as a strength member. These networked units may be connected to recording system 104 by one or more telemetry and/or power connections coupled together in "daisy chain" fashion. For example, as described further in conjunction with FIG. 2, data from sensors 116 may be digitized by a sensor digitizing unit and provided to telemetry units in digital form. The digitized data may then be modulated onto a carrier for example, which may then be transmitted to recording system 104. The telemetry signals may be transmitted to the survey vessel 102 via the daisy-chained telemetry connections. Networked units 109 may also include auxiliary units and power units. Power units may supply conditioned power to other networked units 109. Although networked units 109 are illustrated within streamers 106, in some embodiments networked units may span multiple streamer sections, and in still other embodiments a single networked unit may span an entire length of a streamer. Further, in some embodiments, networked units may be located in connector modules between streamer sections, and in other embodiments networked units may be located in connector modules in some locations of the streamer and embedded or otherwise enclosed within the streamer in other locations of the streamer.

Figure 2:
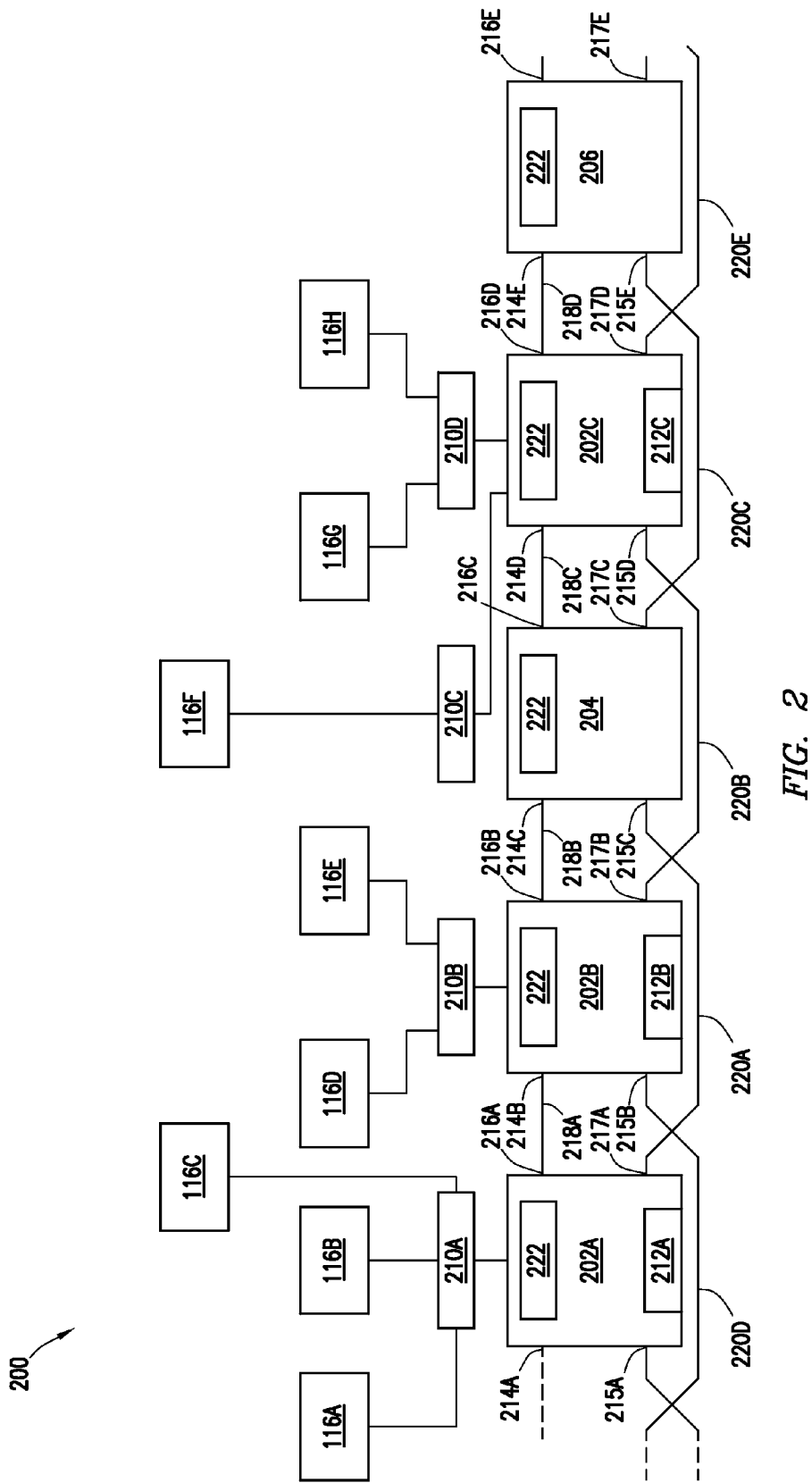
FIG. 2 shows a block diagram of a set of networked units in accordance with at least some embodiments.

FIG. 2 illustrates a block diagram of a portion 200 of a set of such networked units, comprising telemetry units 202A-C, power unit 204 and auxiliary unit 206. Telemetry units 202A-C may receive data from sensors 116 via sensor digitizing units 210A-D and may communicate the data to the shipboard recording system 104. Power units 204 may provide controlled power to other networked units.

Telemetry units 202A-C may receive data from sensors 116 via sensor digitizing units 201A-D may and communicate data to the shipboard recording system 104. Telemetry units may communicate such data in digital form. Telemetry units 202A-C are shown coupled to sensors 116A-H via sensor digitizing units 210A-D. In at least some embodiments sensor digitizing units 210A-D may include an analog-to-digital converter (ADC). In still other embodiments, sensor digitizing units 210A-D may be data acquisition computer, field programmable gate arrays or the like. In some embodiments the ADCs may be implemented as integrated in the telemetry units, and in yet other embodiments the sensor digitizing units may be implemented as discrete units as illustrated in FIG. 2. The sensor digitizing units may be coupled to the telemetry units electrically, optically or by any other suitable interface. In at least some embodiments, sensor digitizing units 210A-D may be coupled to the telemetry units via a daisy chain interconnection. While, for the purpose of illustration three sensors are shown coupled to sensor digitizing unit 210A, two sensors coupled to each of sensor digitizing units 210B and 210D, and a single sensor coupled to sensor digitizing units 210C, in an embodiment of a streamer 106, a sensor digitizing unit may be coupled to and receive data from one to about twelve sensors. In some embodiments, a sensor digitizing unit may couple to as many as 32 sensors. In any case, the specific number of sensors coupled to a sensor digitizing unit is not limiting, and any number of sensors may, in principle, be coupled to a sensor digitizing unit. Similarly, for the purpose of illustration, each of telemetry units 202A-B are depicted as being coupled to a single sensor digitizing unit, 210A and 210B respectively, and telemetry unit 202C is depicted a being coupled to two sensor digitizing unit s, 210C and 210D. In an embodiment of sensor streamer 106, each telemetry unit may be coupled to and receive data from as many as about twenty-four to about one hundred digitizing units. However, the specific number of sensor digitizing units coupled to a telemetry unit is not limiting, and any number of sensor digitizing units may, in principle, be coupled to a telemetry unit.

The digitized data may then be provided to modulators 212A-C which may modulate the digitized data onto a carrier for transmission to the onboard recording equipment. Examples of modulation which may be used include frequency shift keying (FSK), phase shift keying (PSK) quadrature amplitude modulation (QAM), quadrature phase shift keying (QPSK) or discrete multi-tone (DMT).

For the purpose of illustration, assume that telemetry unit 202C represents a device proximal to the survey vessel and telemetry unit 202A represents a device distal to the survey vessel. Telemetry signals from a telemetry unit, say telemetry unit 202A may be transmitted toward the recording system 104 and pass through the downstream telemetry units 202B and 202C. Failure of one of these telemetry units, or a connection therebetween, could prevent the telemetry data from telemetry unit 202A from reaching the survey vessel. Thus, the daisy-chained networked units may be coupled by bypass interconnections which provide for bypassing such a failed networked unit or connection, in accordance with the principles now described in further detail.

In the illustrated embodiment, each of the networked units includes two input ports and two output ports. In some embodiments, the input ports may be configured to connect to telemetry, communications or data channels, and in at least some embodiments, the ports may be configured to connect to power transmission lines or buses. And in still other embodiments, the ports may be configured to connect to both telemetry, communications or data channels and power transmission channels. Telemetry unit 202A includes daisy chain input port 214A and daisy chain output port 216A. Likewise, telemetry unit 202B comprises daisy chain input port 214B and daisy chain output port 216B, power unit 204 comprises daisy chain input port 214C and daisy chain output port 216C, telemetry unit 202C includes daisy chain input port 214D and daisy chain output port 216D, and auxiliary unit 206 comprises daisy chain input port 214E and daisy chain output port 216E. Daisy chain interconnection 218A coupling daisy chain output port 216A of telemetry unit 202A to daisy chain input port 214B of telemetry unit 202B and similar daisy chain interconnections 218B, 218C and 218D also comprise a daisy chain interconnection between the respective networked units, namely telemetry unit 202B, power unit 204, telemetry unit 202C and auxiliary unit 206. A second set of interconnections, 220A, 220B and 220C, provide a bypass path to allow routing around a faulty networked unit or daisy chain connection. Thus, bypass interconnection 220A couples output port 217A of telemetry unit 202A to input port 215C of power unit 204. Likewise, bypass interconnection 220B couples output port 217B of telemetry unit 202B to input port 215D of telemetry unit 202C and interconnection 220C couples output port 217C to input port 215E of auxiliary unit 206. Bypass interconnections 220D and 220E provide similar redundant paths coupling input port 215B and output port 217D to networked units upstream and downstream of portion 200 (not shown in FIG. 2), respectively. In this way, a failure of, for example, telemetry unit 202B, or the daisy chain interconnections, 218A, 218B therebetween, may be bypassed via bypass interconnection 220A. On detection of such failure condition by telemetry unit 202A, telemetry unit 202A may enable bypass interconnection 220A, and communication may then proceed toward recording system 104. Similarly, output port 217E may provide a bypass interconnection for auxiliary unit 206 to networked units downstream of portion 200, and input port 215A may provide a bypass interconnection to networked units upstream of portion 200. In some embodiments, interconnections may be electrical and communication via electrical signals. In other embodiments, interconnections may be optical and communications by optical signals and in yet other embodiments, combination thereof may be used. In still other embodiments any suitable communication method may be used. Further, daisy chain interconnections 218A-D and bypass interconnections 220A-E may also carry electrical power as well as telemetry signals, as set forth above. Although an exemplary failure has described above in terms of a telemetry signal failure, a failure of a daisy chained power connection or unit coupled to such a power connection may also be similarly bypassed via bypass interconnections 220A-E.

Power unit 204 may be included to provide power to other networked units. Networked units connected to power unit 204, such as telemetry unit 202C, may receive electrical power via power unit 204, and power unit 204 may control the state of the electrical power supplied to the networked units daisy chained with power unit 204. Thus, if a failure occurs in such a networked unit, a for example a short circuit or power consumption in excess of a predetermined specification, power unit 204 may detect the anomaly and disable the power to the failed unit. However, in this case, as described above, daisy chained units both upstream and downstream of the malfunctioning unit would also lose power.

Alternatively, by enabling a bypass interconnection, a power unit 204 may bypass a malfunctioning networked unit and maintain power to at least units that are otherwise daisy chained with the malfunctioning unit. For example, if telemetry unit 202C fails whereby its current consumption exceeds a predetermined specification, power unit 204 may disable daisy chain interconnection 218C. Power unit 204 may also enable bypass interconnection 220C, thereby bypassing telemetry unit 202C, and continue to supply power to networked units downstream of telemetry unit 202C, such as auxiliary unit 206. Although bypass interconnection 220C has been described in conjunction with supplying power to networked units, as previously described bypass interconnection 220C may also transport daisy chained communication signals between telemetry units 202 and the survey vessel 102, for example. Such communication signals may, in at least some embodiments, be bidirectional. Power unit 204 may also detect a malfunction of a daisy chained telemetry signal, and bypass daisy chain interconnection 218C and select redundant bypass interconnection 220C.

An interconnection controller within a networked unit may be used to detect malfunction on a daisy chain interconnection and select a bypass interconnection to bypass the malfunction. In the exemplary embodiment of telemetry units 202, power unit 204 and auxiliary unit 206 include an interconnection controller 222 which may monitor the daisy chain interconnections 218 for fault conditions and change between the daisy chain interconnections and bypass interconnections 220 accordingly. A fault condition on an interconnection may arise from an anomaly in a downstream networked device or on, for example, a power or telemetry channel between networked units.

Figure 3:
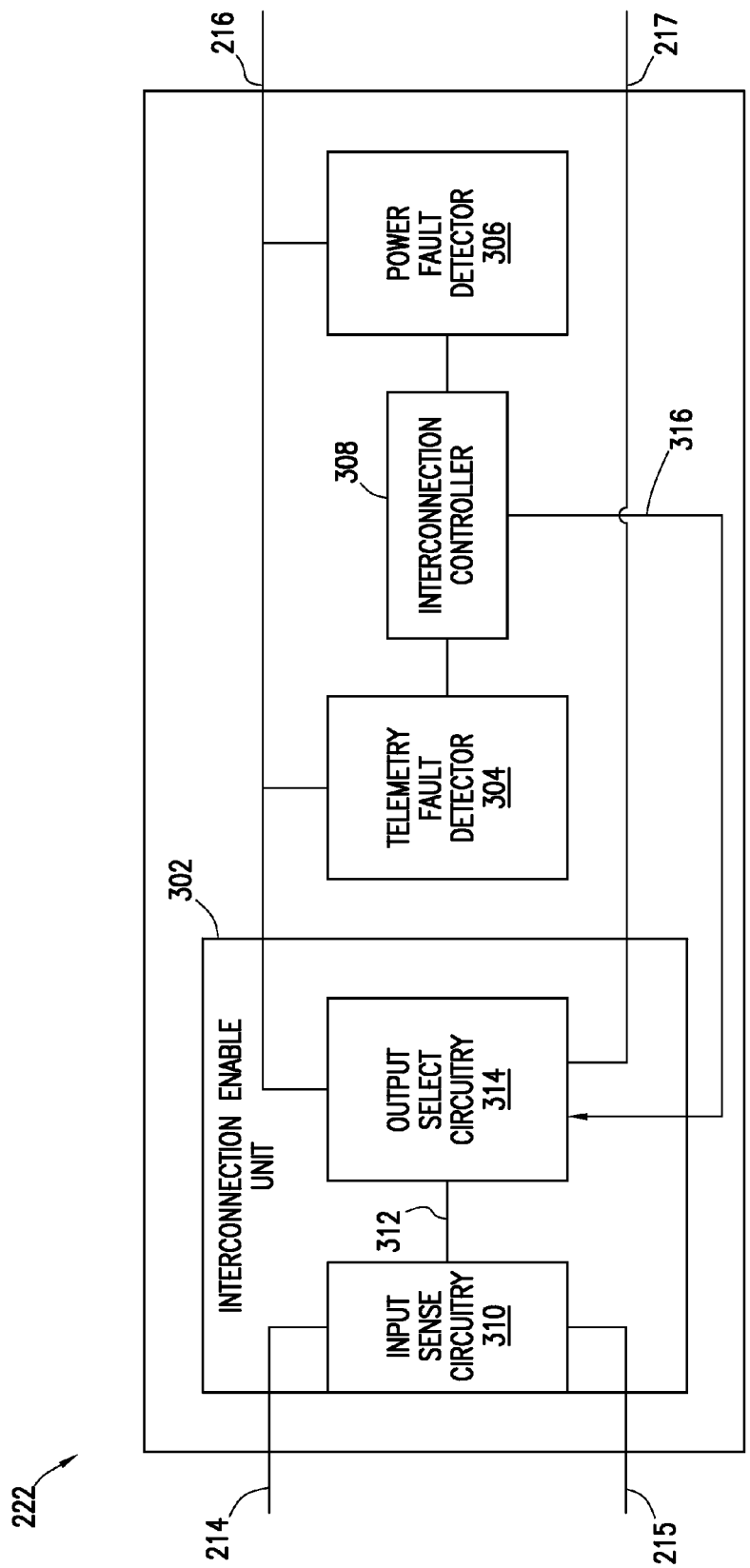
FIG. 3 shows a block diagram of a control unit in accordance with at least some embodiments.

This may be further understood by referring now to FIG. 3, showing a block diagram of an exemplary interconnection controller 222 in accordance with an embodiment. Interconnection controller 222 may include an interconnection enable unit 302, telemetry fault detector 304, a power fault detector 306 and an interconnection controller 308. Interconnection enable unit 302 may connect daisy chain input port 214 to one of daisy chain output port 216 or output port 217 based on the state of the downstream interconnections and/or devices. Further, input signals and power may be received on either daisy chain input port 214 or input port 215 depending on the state of upstream interconnections or devices. In other words, an upstream device may have itself bypassed a faulty intervening unit or connection to reach the particular device including interconnection controller 222. Input sense circuitry 310 may detect which of input ports 214 and 215 is active in that it is receiving telemetry and/or power from an upstream unit. For example, input sense circuitry 310 may detect the presence of power on one of input ports 214 and 215. In at least some embodiments, input sense circuitry may detect telemetry data on the active one of daisy chain input port 214 and input port 215. In some embodiments, telemetry units (such as units 202, FIG. 2) may provide a heartbeat signal at a predetermined interval which may be detected by input sense circuitry 310. Such a heartbeat signal may be used in embodiments where telemetry but not power is provided in a daisy chain configuration, and particularly in such embodiments where telemetry data rates are low, whereby a change in input ports by an upstream device may otherwise escape detection. Input sense circuitry 310 may connect the active input port to node 312 which may be input to output select circuitry 314.

Connection controller 308 may select the state of output select circuitry 314 in response to signals received from telemetry fault detector 304 and power fault detector 306. If daisy chained downstream devices or interconnections are free of fault conditions, both telemetry fault detector 304 and power fault detector 306 may provide respective output signal values to connection controller 308 in a first predetermined state denoting a fault-free condition on the daisy chain interconnection downstream. Connection controller 308 may then set a first predetermined value on control line 316 whereby output select circuitry 314 connects node 312 to daisy chain output port 216. Conversely, if either of telemetry fault detector 304 or power fault detector 306 determines that a downstream fault condition exists on the daisy chain interconnection, the respective one of telemetry fault detector 304 and power fault detector 306 may provide an output signal having a predetermined value denoting a fault condition exists in the daisy chain interconnection. Connection controller 308 may then set a second predetermined value on control line 316 whereby output select circuitry 314 connects node 312 to output 317, thereby enabling the bypass interconnect and disabling the daisy chain interconnect. Output select may connect node 312 to output 317 by, for example in at least some embodiments, electronic switches, optical switches or address table remapping, or any other suitable means as may be reflected by the communication pathway architecture.

For example, power fault detector 306 may monitor the daisy chain power interconnection for an overcurrent condition. Such a condition may represent a short circuit or other failure occurring in the device downstream of the particular networked unit sensing the overcurrent condition. Connection controller 308 may then signal output select circuitry 314 to select output port 217 thereby bypassing the failed device. In at least some embodiments, power fault detector 306 may employ a Hall effect current sensor to sense the current in the daisy chain power interconnections.

Similarly, telemetry fault detector 304 may monitor the daisy chain telemetry interconnection for a loss of telemetry signal. In particular, the telemetry fault detector may monitor the telemetry interconnection for upstream telemetry communications from survey vessel 102. A loss of upstream communication for a predetermined interval of time may be indicative of a failure in a downstream telemetry unit. In at least some embodiments, telemetry units (such as telemetry units 202, FIG. 2) may send a beacon or heartbeat signal which may be used by telemetry fault detector 304 to sense a fault condition on daisy chain telemetry interconnections. In such embodiments, a loss of the heartbeat signal may be indicative of a fault condition. In response to a telemetry interconnection fault condition, connection controller 308 may then signal output select to connect to output port 217, as previously described.

Because a fault condition may be detected locally, the site of the failed unit or daisy chain interconnection may be determined. Thus, in an embodiment, connection controller 308 may be coupled to a telemetry unit, such as a telemetry unit 202, and reporting information indicative of the detected fault to survey vessel 102, for example via the telemetry unit. Such information may include information identifying the particular connection controller, a serial number for example. The reported information may then be used to locate the faulty unit or daisy chain connection which may facilitate repair of the streamer including the faulty unit.

In the exemplary embodiment of FIG. 2, the interconnection controller (e.g. interconnection controller 222, FIG. 2) is shown disposed within the networked units themselves. In at least some embodiments interconnection controllers may be deployed in a separate control unit, however the principles of operation would be substantially unaffected by the form of deployment.

Figure 4:
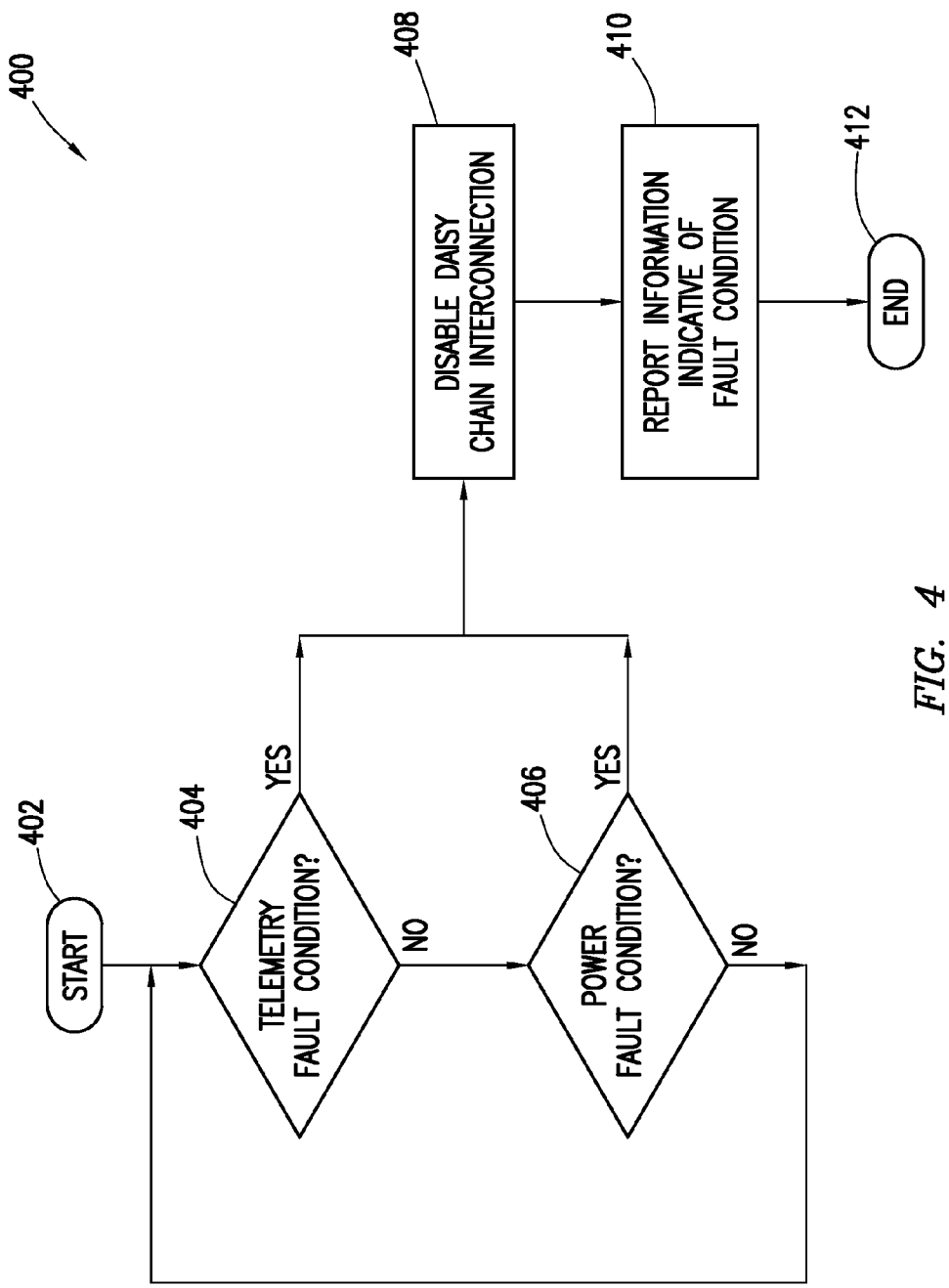
FIG. 4 shows a flow chart of a method in accordance with at least some embodiments.

FIG. 4 shows a flow chart of a method 400 for bypassing a networked unit in accordance with an example embodiment. The method starts in block 402 and in block 404, the method determines if a telemetry fault condition is detected on the telemetry daisy chain interconnection. A telemetry fault condition may be detected in block 404 as described in conjunction with FIG. 3. If no telemetry fault condition has been detected, block 404 falls through the "No" branch to block 406. In block 406, method 400 determines if a power fault condition is detected on the power daisy chain interconnection. A power fault condition may be detected in block 406 as described above in conjunction with FIG. 3. If no power fault condition is detected, block 406 falls through the "No" branch to return to block 404 wherein method 400 continues to monitor the state of the daisy chain interconnections.

Returning to blocks 404 and 406, if either a telemetry fault condition is detected (block 404) or a power fault condition is detected (block 406) on the daisy chain interconnections, the blocks fall through the respective "Yes" branch, depending on the type of fault condition detected. And, in block 408, the daisy chain interconnection may be disabled by bypassing it. In at least some embodiments, block 404 may bypass the daisy chain interconnection as described above in conjunction with FIGS. 2 and 3. In block 410, information indicative of the fault condition is reported to the survey vessel. Such information may include a serial number or other identifier of the unit bypassed, or an analogous identifier of the reporting unit, and the nature of the fault condition (e.g. telemetry, power) which information may be logged and used to facilitate repair of the streamer. Method 400 ends at block 410.

Figure 5:
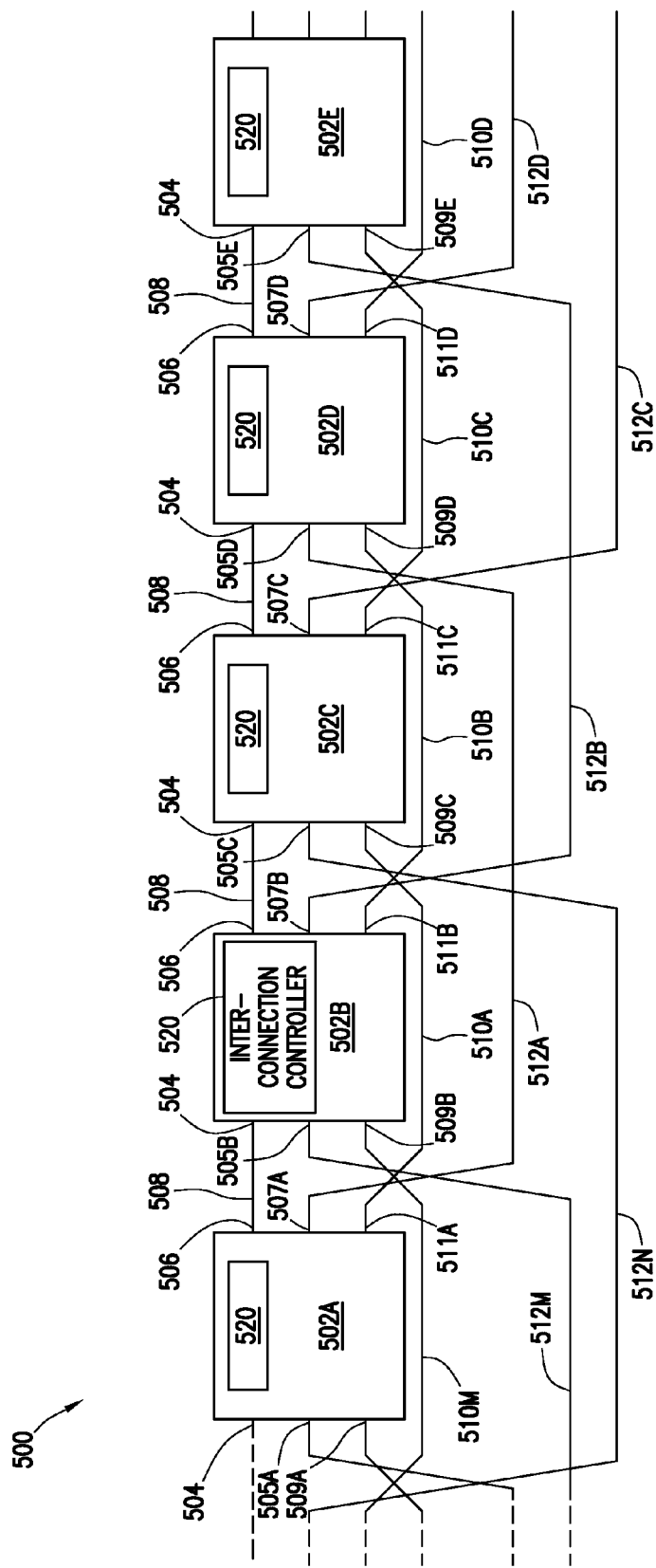
FIG. 5 shows a block diagram of a set of networked units in accordance with at least some embodiments.

Refer now to FIG. 5 showing a block diagram of a portion 500 of a set of networked units in accordance with another embodiment. Portion 500 includes networked units 502A-E, which may comprise telemetry units, power units, sensor digitizing units, and auxiliary units as previously described. Networked units 502A-E may be interconnected in daisy chain fashion via input ports 504 and output ports 506 having interconnections 508 therebetween. Further networked units 502A-E may be selectably interconnected via bypass interconnections 510 and 512, as described in further detail below in conjunction with FIG. 6.

Bypass interconnections 510 may connect two networked units 502, bypassing an intervening unit in the daisy chain configuration. Thus, for example interconnection 510A may couple an output port 511A of networked unit 502A to an input port 509C of networked unit 502C, bypassing networked unit 502B. Similarly, interconnection 510B may connect output port 511B of networked unit 502B to input port 509D of networked unit 502D, bypassing networked unit 502C. Bypass interconnection 510C may connect output port 511C of networked unit 502C to input port 509E of networked unit 502E bypassing networked unit 502D. Bypass interconnection 510M may connect input port 509B of networked unit 502B to a device (not shown) upstream of portion 500. Similarly input port 509A of networked unit 502A may be connected to a device upstream of portion 500. Bypass interconnect 512D may connect output port 511D of networked unit 502D to a device downstream (not shown) of portion 500.

Portion 500 also may include a second set of bypass interconnections 512. Bypass interconnections 512 may connect two networked units 502 while bypassing two intervening networked units in the daisy chain configuration. For example, bypass interconnection 512A couples output port 507A of networked unit 502A to input port 505D of networked unit 502D, bypassing networked units 502B, C. In similar fashion, interconnection 512B couples output port 507B of networked unit 502B to input port 505E of networked unit 502E, bypassing networked units 502C, D. Bypass interconnections 512C, D may connect output ports 507C and 507D 502C, D, respectively to networked units (not shown) downstream of portion 500. Bypass interconnections 512M, N may connect input ports 505B, C of units 502B, C, respectively to networked units (not shown) upstream of portion 500. Input port 505A of networked unit 502A may likewise connect via a bypass interconnection to a networked unit (not shown) upstream of portion 500.

The disabling of a daisy chain interconnection by the enabling of a bypass interconnection may be controlled by an interconnection controller 520. In the exemplary embodiment of FIG. 5, interconnection controllers 520 are shown as disposed within networked units 502. However, in other embodiments, interconnection controllers 520 may be deployed in a separate control unit. In still other embodiments, a portion of interconnection controllers 520 may be disposed within some networked units 502 and another portion may be deployed in separate control units.

Figure 6:
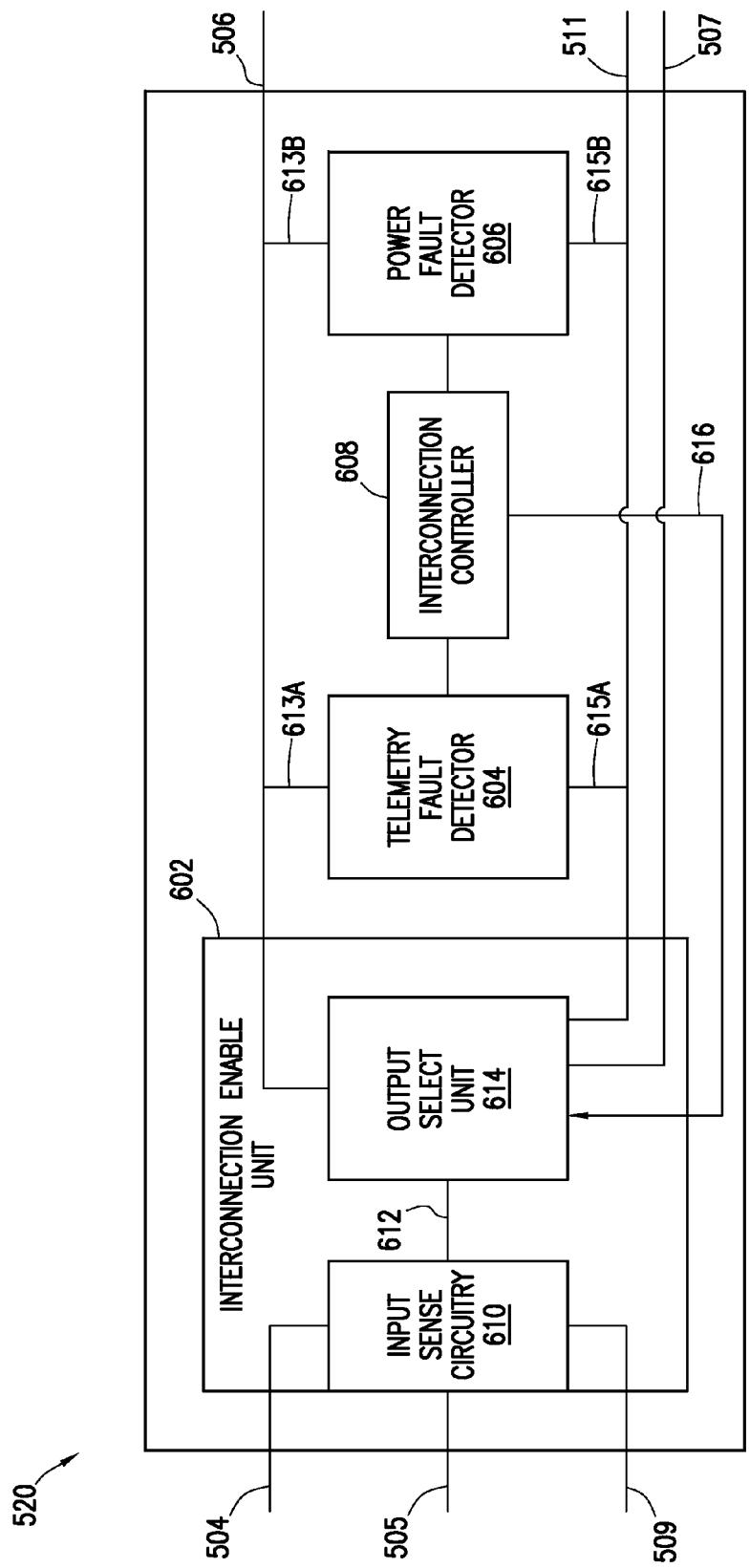
FIG. 6 shows a block diagram of a control unit in accordance with at least some embodiments.

Turning to FIG. 6, an interconnection controller 520 in accordance with an embodiment is shown in further detail. Interconnection controller 520 includes an interconnection enable unit 602, a telemetry fault detector 604, power fault detector 606 and interconnection controller 608. Interconnection enable unit 602 includes an input sense circuitry 610 and output select unit 614. The operation of input sense circuitry 610 may be similar to the operation of input sense circuitry 310, FIG. 3. However, input sense circuitry 610 senses daisy chain input port 504 and bypass input ports 505 and 509 to determine which input port is active, as described above. The active input port is connected to node 612.

Telemetry fault detector 604 and power fault detector 606 may be similar to telemetry fault detector 304 and power fault detector 306 described above in conjunction with FIG. 3. However, in the embodiment of interconnection controller 520, these devices may be connected both to daisy chain output port 506, via lines 613A, B, respectively, but also to bypass interconnection output port 511, via lines 615A,B, respectively. Thus, if a fault condition on the daisy chain interconnection is sensed by one or both of telemetry fault detector 304 and power fault detector 606, interconnection controller 608 may signal output select unit 614 to enable the bypass interconnection through bypass output port 511. Recall, a bypass interconnection via an output port 511 may bypass a single unit in the daisy chain configuration. If, however a pair of units, for example, have failed or otherwise present a fault condition, enabling output port 511 may not clear the fault condition. In that case, one or both of telemetry fault detector 604 and power fault detect unit 606, depending on the type of fault condition, may continue sense the fault condition on output port 511 via lines 615, and maintain its fault assertion with respect to interconnection controller 608. Interconnection controller 608 may then signal output select unit 614 to disable the interconnection via bypass output port 511 and enable the bypass interconnection via output port 507 (e.g. a bypass 512, FIG. 5). In this way, a failure of two units in a daisy chain configuration that have failed may be bypassed.

Figure 7:
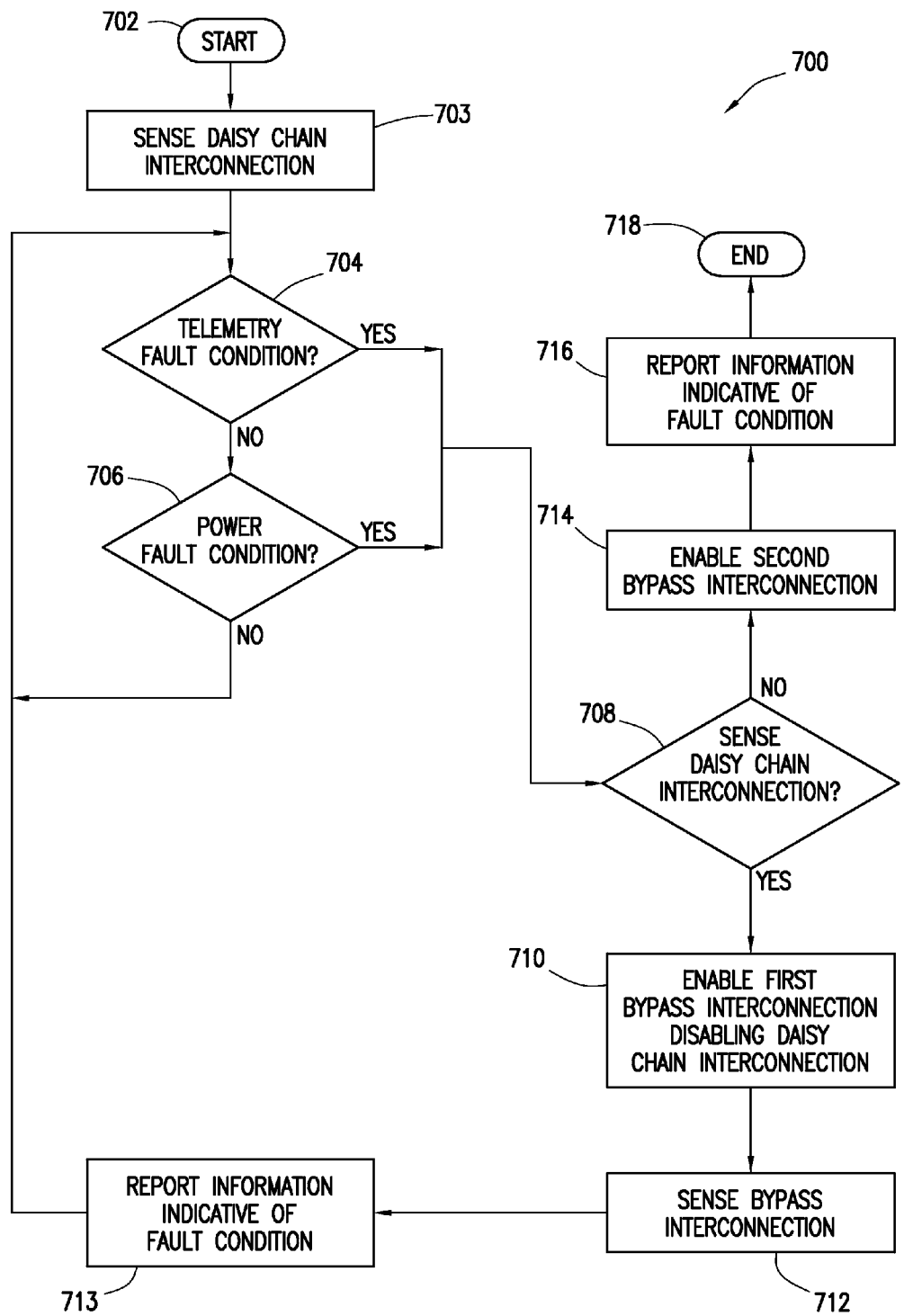
FIG. 7 shows a flow chart of a method in accordance with at least some embodiments.

This may be further understood by referring to FIG. 7, illustrating a flow chart of a method 700 for disabling a networked unit in accordance with an example embodiment. The method starts in block 702 and senses the daisy chain interconnection output port (e.g. an output port 506), block 703. In block 704, the method determines if a telemetry fault condition is detected on the telemetry daisy chain interconnection. A telemetry fault condition may be detected in block 704 as described in conjunction with FIG. 3. If no telemetry fault condition has been detected, block 704 falls through the "No" branch to block 706. In block 706, method 700 determines if a power fault condition is detected on the power daisy chain interconnection. A power fault may be detected in block 706 also as described above in conjunction with FIG. 3. If no power fault condition is detected, block 706 falls through the "No" branch to return to block 704 wherein method 400 continues to monitor the state of the daisy chain interconnections.

Returning to blocks 704 and 706, if either a telemetry fault condition is detected (block 704) or a power fault condition (block 706) on the daisy chain interconnections, the blocks fall through the respective "Yes" branch, depending on the type of fault condition detected. In block 708, method 700 branches depending on which of the output ports is being sensed. If the daisy chain interconnection is being sensed, block 708 falls through the "Yes" branch and in block 710 the daisy chain interconnection is bypassed via the first bypass interconnection (e.g. via an output port 511), thereby disabling it. In at least some embodiments, the first bypass may be enabled as described in conjunction with, inter alia, FIG. 6. Method 700 then senses the bypass interconnection enabled in block 710, block 712. In block 713, information indicative of the fault condition is reported to the survey vessel. Such information may include a serial number or other identifier of the unit or units bypassed, or an analogous identifier of the reporting unit, and the nature of the fault (e.g. telemetry, power) which information may be logged and used to facilitate repair of the streamer. Method 700 returns to block 704 to determine if the fault is cleared in response to the bypassing of the downstream unit. If a fault condition is not cleared, i.e. the fault condition remains, one of blocks 704 and 706 fall through its respective "Yes" branch to block 708. Because the bypass interconnection is being sensed via block 712, block 708 proceeds by the "No" branch to block 714. In block 714, the second bypass interconnection is enabled (e.g. via an output port 507). In at least some embodiments, the second bypass may be enabled as described in conjunction with, inter alia, FIG. 6. In block 716, information indicative of the fault condition is reported to the survey vessel, similarly to block 713. Method 700 ends at block 718.

References to "one embodiment", "an embodiment", "a particular embodiment", and "some embodiments" indicate that a particular element or characteristic is included in at least one embodiment of the invention. Although the phrases "in one embodiment", "an embodiment", "a particular embodiment", and "some embodiments" may appear in various places, these do not necessarily refer to the same embodiment.

The above discussion is meant to be illustrative of the principles and various embodiments of the present invention. Numerous variations and modifications will become apparent to those skilled in the art once the above disclosure is fully appreciated. For example, the principles disclosed herein may be applied to embodiments wherein N+1 connections may be used to bypass N faulty units and/or interconnections, or combinations thereof. It is intended that the following claims be interpreted to embrace all such variations and modifications.

What is claimed is:

1. A method comprising:
   in a streamer towed by a survey vessel, the streamer comprising a first, second and third networked unit:
      sensing a first interconnection of a daisy chain, the first interconnection being between the first networked unit and the second networked unit, and
      determining that a fault condition exists on the first interconnection in response to the sensing;
      disabling the first interconnection responsive to the fault condition; and
      enabling a second interconnection responsive to the fault condition, wherein the second interconnection couples the first networked unit and the third networked unit, and wherein the second interconnection does not couple to the second networked unit.

2. The method of claim 1 wherein the first interconnection comprises a telemetry interconnection and the fault condition comprises a telemetry fault condition on the telemetry interconnection.

3. The method of claim 1 wherein the first interconnection further comprises a power interconnection, and the fault condition comprises a power fault condition on the power interconnection.

4. The method of claim 1 further comprising reporting information indicative of the fault condition to a recording system on the survey vessel.

5. The method of claim 1 further comprising:
sensing the second interconnection;
determining that a fault condition exists on the second interconnection in response to the sensing;
disabling the second interconnection responsive to the fault condition; and
enabling a third interconnection, wherein:
the streamer comprises a fourth networked unit,
the third interconnection couples the first networked unit and the fourth networked unit, and
the third interconnection does not couple to the second networked unit and does not couple to the third networked unit.

6. A system comprising:
a streamer configured to be towed behind a survey vessel;
a first networked unit deployed in the streamer;
a second networked unit deployed in the streamer;
a third networked unit deployed in the streamer;
wherein a first output port of the first networked unit is coupled to a first input port of the second networked unit;
wherein a first output port of the second networked unit is coupled to a first input port of the third networked unit;
wherein a second output port of the first networked unit is directly coupled to a second input port of the third networked unit; and
wherein the first networked unit is configured to communicate with the third networked unit on the second output port of the first networked unit, if a telemetry fault condition occurs between the first and second networked units, and to communicate with the second networked unit on the first output port of the first networked unit otherwise.

7. The system of claim 6,
wherein the telemetry fault condition comprises at least one failure selected from the group consisting of:
a failure of the second networked unit;
a failure of a communicative connection between the first output port of the first networked unit and the first input port of the second networked unit; and
a failure of a communicative connection between the first output port of the second networked unit and the first output port of the third networked unit.

8. The system of claim 7 further comprising:
a sensor, wherein when the first networked unit comprises a telemetry unit, and the sensor is coupled to the telemetry unit; and
wherein the telemetry unit communicates data received from the sensor.

9. The system of claim 8 further comprising a sensor digitizing unit coupled to the sensor; and wherein the telemetry unit receives sensor data in digitized form from the sensor digitizing unit.

10. The system of claim 8 wherein the sensor is at least one selected from the group consisting of: seismic survey sensors; accelerometers, hydrophones; geophones; electric field sensors; magnetic field sensors; and electromagnetic survey sensors.

11. The system of claim 6,
wherein the first networked unit is at least one selected from the group consisting of:
a telemetry unit;
a power unit;
a sensor digitizing unit; and
an auxiliary unit.

12. A streamer comprising:
an outer surface;
a rope disposed within the outer surface;
a communication pathway disposed within the outer surface;
a sensor disposed within the outer surface;
a telemetry unit coupled to the sensor via a sensor digitizing unit and configured to transmit data received from the sensor to a survey vessel via the communication pathway;
a first networked unit having a coupling between a first output port of the telemetry unit and an input port of the first networked unit, wherein the coupling is configured to selectably connect the first output port of the telemetry unit and the input port of the first networked unit;
a second networked unit having a coupling between a second output port of the telemetry unit and an input port of the second networked unit, wherein the coupling is configured to selectably connect the second output port of the telemetry unit and the input port of the second networked unit; and
a control unit connected to the coupling between the first output port of the telemetry unit and the input port of the first networked unit, and configured to sense a telecommunication fault condition thereon,
wherein the control unit is configured disable the coupling between the first output port of the telemetry unit and the input port of the first networked unit and enable the coupling between a second output port of the telemetry unit and an input port of the second networked unit if a communications fault occurs between the telemetry unit and first networked unit.

13. The streamer of claim 12 wherein the coupling between the first output port of the telemetry unit and the input port of the first networked unit further comprises a power interconnection configured to transmit electrical power between the first output port of the telemetry unit and the input port of first networked unit, and wherein the control unit is further configured to sense a power fault condition on the power connection.

14. The streamer of claim 13 wherein the coupling between the second output port of the telemetry unit and the input port of the second networked unit further comprises a power interconnection configured to transmit electrical power between the second output port of the telemetry unit and the input port of the second networked unit, and wherein the control unit is further configured to disable the power interconnection between the first output port of the telemetry unit and the input port of the first networked unit and enable the power interconnection between the second output port of the telemetry unit and the input port of the second networked unit if a power fault condition occurs between the telemetry unit and first networked unit.

15. The streamer of claim 12 further comprising a sensor digitizing unit coupled to the sensor and the telemetry unit, and configured to digitize data received from the sensor.

16. The streamer of claim 12 wherein the sensor is at least one selected from the group consisting of: seismic survey sensors, and electromagnetic survey sensors.

17. The streamer of claim 12 further comprising:
a third networked unit, the third networked unit having a coupling between a third output port of the telemetry unit and an input port of the third networked unit, wherein the coupling is configured to selectably connect the third output port of the telemetry unit and the input port of the third networked unit; and
wherein the control unit is connected to the coupling between the second output port of the telemetry unit and the input port of the second networked unit and is further configured to sense a telemetry fault condition thereon.

18. The streamer of claim 17 wherein the control unit is further configured to disable the coupling between the second output port of the telemetry unit and the input port of the second networked unit and enable the coupling between the third output port of the telemetry unit and an input port of the third networked unit if a telemetry fault condition is detected on the coupling between the second output port of the telemetry unit and the input port of the second networked unit.

19. The streamer of claim 17 wherein:
the coupling between the first output port of the telemetry unit and an input port of the first networked unit further comprises a power interconnection configured to transmit electrical power between the first output port of the telemetry unit and the input port of first networked unit,
the coupling between the second output port of the telemetry unit and an input port of the second networked unit further comprises a power interconnection configured to transmit electrical power between the second output port of the telemetry unit and the input port of second networked unit;
the coupling between the third output port of the telemetry unit and an input port of the third networked unit further comprises a power interconnection configured to transmit electrical power between the third output port of the telemetry unit and the input port of third networked unit; and
wherein the control unit is further configured to sense a power fault condition on the power interconnection between the second output port of the telemetry unit and the input port of second networked unit.

20. The streamer of claim 19 wherein the control unit is further configured to disable the power interconnection between the second output port of the telemetry unit and the input port of the second networked unit and enable the selectable power interconnection between the third output port of the telemetry unit and an input port of the third networked unit if a power fault condition is detected on the power interconnection between the second output port of the telemetry unit and the input port of the second networked unit.

* * * * *